US 11,429,466 B2

(12) United States Patent
Horvath et al.

(10) Patent No.: US 11,429,466 B2
(45) Date of Patent: Aug. 30, 2022

(54) OPERATING SYSTEM-BASED SYSTEMS AND METHOD OF ACHIEVING FAULT TOLERANCE

(71) Applicant: Stratus Technologies Bermuda, Ltd., Hamilton (BM)

(72) Inventors: Charles J. Horvath, Jamaica Plain, MA (US); Lei Cao, Westford, MA (US); Steven Michael Haid, Bolton, MA (US); John R. MacLeod, Cambridge, MA (US); Angel L. Pagan, Holden, MA (US); Nathaniel Horwitch Dailey, Stow, MA (US); Wendy J. McNaughton, Hopkinton, MA (US); Stephen J. Wark, Shrewsbury, MA (US)

(73) Assignee: STRATUS TECHNOLOGIES IRELAND LTD.

( * ) Notice: Subject to any disclaimer, the term of this patent is extended or adjusted under 35 U.S.C. 154(b) by 0 days.

(21) Appl. No.: 16/900,909

(22) Filed: Jun. 13, 2020

(65) Prior Publication Data
US 2021/0034447 A1 Feb. 4, 2021

Related U.S. Application Data

(60) Provisional application No. 62/939,890, filed on Nov. 25, 2019, provisional application No. 62/881,152, filed on Jul. 31, 2019.

(51) Int. Cl.
*G06F 11/00* (2006.01)
*G06F 11/07* (2006.01)
(Continued)

(52) U.S. Cl.
CPC ........ *G06F 11/0706* (2013.01); *G06F 9/4411* (2013.01); *G06F 11/1407* (2013.01);
(Continued)

(58) Field of Classification Search
CPC ............ G06F 11/0706; G06F 11/1407; G06F 11/167; G06F 11/3006; G06F 11/302;
(Continued)

(56) References Cited

U.S. PATENT DOCUMENTS 6,355,991 B1   3/2002  Goff et al.
6,633,996 B1  10/2003  Suffin et al.
(Continued)

OTHER PUBLICATIONS

Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.
(Continued)

*Primary Examiner* — Joseph D Manoskey
(74) *Attorney, Agent, or Firm* — K&L Gates LLP (57) ABSTRACT

A method and apparatus of performing fault tolerance in a fault tolerant computer system comprising: a primary node having a primary node processor; a secondary node having a secondary node processor, each node further comprising a respective memory; a respective checkpoint shim; each of the primary and secondary node further comprising: a respective non-virtual operating system (OS), the non-virtual OS comprising a respective; network driver; storage driver; and checkpoint engine; the method comprising the steps of: acting upon a request from a client by the respective OS of the primary and the secondary node, comparing the result obtained by the OS of the primary node and the secondary node by the network driver of the primary node for similarity, and if the comparison of indicates similarity less than a predetermined amount, the primary node network driver informs the primary node checkpoint engine to begin a checkpoint process.

27 Claims, 5 Drawing Sheets

(51) Int. Cl.
*G06F 11/14* (2006.01)
*G06F 9/4401* (2018.01)
*G06F 11/30* (2006.01)
*G06F 11/16* (2006.01)

(52) U.S. Cl.
CPC .......... *G06F 11/167* (2013.01); *G06F 11/302* (2013.01); *G06F 11/3006* (2013.01)

(58) Field of Classification Search
CPC ............. G06F 11/0709; G06F 11/1146; G06F 11/1458; G06F 11/1616; G06F 11/1629; G06F 9/4411
See application file for complete search history.

(56) References Cited

U.S. PATENT DOCUMENTS

| | | | |
|---|---|---|---|
| 6,687,851 B1 | 2/2004 | Somers et al. |
| 6,691,225 B1 | 2/2004 | Suffin |
| 6,691,257 B1 | 2/2004 | Suffin |
| 6,708,283 B1 | 3/2004 | Nevin et al. |
| 6,718,474 B1 | 4/2004 | Somers et al. |
| 6,766,413 B2 | 7/2004 | Newman |
| 6,766,479 B2 | 7/2004 | Edwards |
| 6,802,022 B1 | 10/2004 | Olson |
| 6,813,721 B1 | 11/2004 | Tetreault et al. |
| 6,842,823 B1 | 1/2005 | Olson |
| 6,862,689 B2 | 3/2005 | Bergsten et al. |
| 6,874,102 B2 | 3/2005 | Doody et al. |
| 6,886,171 B2 | 4/2005 | MacLeod |
| 6,928,583 B2 | 8/2005 | Griffin et al. |
| 6,970,892 B2 | 11/2005 | Green et al. |
| 6,971,043 B2 | 11/2005 | McLoughlin et al. |
| 6,996,750 B2 | 2/2006 | Tetreault |
| 7,065,672 B2 | 6/2006 | Long et al. |
| 7,496,786 B2 | 2/2009 | Graham et al. |
| 7,496,787 B2 | 2/2009 | Edwards et al. |
| 7,669,073 B2 | 2/2010 | Graham et al. |
| 7,904,906 B2 | 3/2011 | Puthukattukaran et al. |
| 7,958,076 B2 | 6/2011 | Bergsten et al. |
| 8,117,495 B2 | 2/2012 | Graham |
| 8,161,311 B2 | 4/2012 | Wiebe |
| 8,234,521 B2 | 7/2012 | Graham et al. |
| 8,271,416 B2 | 9/2012 | Al-Biek et al. |
| 8,312,318 B2 | 11/2012 | Graham et al. |
| 8,381,012 B2 | 2/2013 | Wiebe |
| 8,812,907 B1 | 8/2014 | Bissett et al. |
| 9,251,002 B2 | 2/2016 | Manchek et al. |
| 9,588,844 B2 | 3/2017 | Bissett et al. |
| 9,652,338 B2 | 5/2017 | Bissett et al. |
| 9,760,442 B2 | 9/2017 | Bissett et al. |
| 10,216,598 B2 | 2/2019 | Haid et al. |
| 2001/0042202 A1 | 11/2001 | Horvath et al. |
| 2002/0016935 A1 | 2/2002 | Bergsten et al. |
| 2002/0070717 A1 | 6/2002 | Pellegrino |
| 2003/0046670 A1 | 3/2003 | Marlow |
| 2003/0095366 A1 | 5/2003 | Pellegrino |
| 2006/0159011 A1* | 7/2006 | Dalal ..................... H04L 45/02 370/220 |
| 2006/0222125 A1 | 10/2006 | Edwards et al. |
| 2006/0222126 A1 | 10/2006 | Edwards et al. |
| 2006/0259815 A1 | 11/2006 | Graham et al. |
| 2006/0274508 A1 | 12/2006 | LaRiviere et al. |
| 2007/0011499 A1 | 1/2007 | Begsten et al. |
| 2007/0028144 A1 | 2/2007 | Graham et al. |
| 2007/0038891 A1 | 2/2007 | Graham |
| 2007/0106873 A1 | 5/2007 | Lally et al. |
| 2007/0174484 A1 | 7/2007 | Lussier et al. |
| 2009/0249129 A1 | 10/2009 | Femia |
| 2012/0226832 A1* | 9/2012 | Niino ...................... G06F 3/061 710/33 |
| 2015/0205688 A1 | 7/2015 | Haid et al. |
| 2015/0212896 A1* | 7/2015 | Pawar ................... G06F 16/128 707/648 |
| 2015/0263983 A1 | 9/2015 | Brennan et al. |
| 2017/0300347 A1* | 10/2017 | Tian .................... G06F 11/1446 |
| 2017/0324609 A1 | 11/2017 | Hong et al. |
| 2018/0046480 A1 | 2/2018 | Dong et al. |
| 2018/0143885 A1* | 5/2018 | Dong .................. G06F 11/1482 |
| 2020/0050523 A1 | 2/2020 | Pawlowski et al. |
| 2021/0034447 A1 | 2/2021 | Horvath et al. |
| 2021/0034464 A1 | 2/2021 | Dailey et al. |
| 2021/0034465 A1 | 2/2021 | Haid et al. |
| 2021/0034483 A1 | 2/2021 | Haid |
| 2021/0034523 A1 | 2/2021 | Dailey |
| 2021/0037092 A1 | 2/2021 | Cao |

OTHER PUBLICATIONS

Dong et al., "COLO: COarse-grain LOck-stepping Virtual Machine for Non-stop Service", https://www.linux-kvm.org/images/1/1d/Kvm-forum-2013-COLO.pdf; 24 pages.

\* cited by examiner

OPERATING SYSTEM-BASED SYSTEMS AND METHOD OF ACHIEVING FAULT TOLERANCE

RELATED APPLICATIONS

This application claims the benefit of priority to U.S. Provisional Application No. 62/881,152 filed on Jul. 31, 2019 and U.S. Provisional Application No. 62/939,890 filed on Nov. 25, 2019, each of which is incorporated herein by reference in its entirety.

FIELD

The disclosure relates generally to fault tolerant systems and more specifically to check pointing in a fault tolerant system.

SUMMARY

In one aspect, the disclosure relates to apparatus of performing fault tolerance in a fault tolerant computer system. In one embodiment the fault tolerant computer system comprises a primary node having a primary node processor and a secondary node having a secondary node processor. In another embodiment each respective node further comprises a respective memory and a respective checkpoint shim. In still another embodiment each of the primary and secondary node further comprises a respective non-virtual operating system (OS). In yet another embodiment the non-virtual OS comprises a respective; network driver; storage driver; and checkpoint engine.

Although the disclosure describes various implementations that are suitable for use with a non-virtualized OS, the disclosure is not expressly limited to such implementations. In various embodiments, one or more techniques, methods, systems, subsystems, and combinations of the foregoing can be implemented using virtualized operating systems, container-based-operating systems, virtualized environments, and various emulators, such as VMware, QEMU, KVM, and others.

In another aspect the disclosure relates to a method for performing fault tolerance in a fault tolerant computer system. In one embodiment the method comprise the steps of: acting upon a request from a client by the respective OS of the primary and the secondary node, comparing the result obtained by the OS of the primary node and the secondary node by the network driver of the primary node for similarity, and if the comparison of indicates similarity less than a predetermined amount, the primary node network driver informs the primary node checkpoint engine to begin a checkpoint process. In one embodiment, the network driver used in various aspects and embodiments is an OS network driver. The OS network driver may comprise a replication and compare component, a determinism enhancer, and a redirector.

In an embodiment, a fault tolerant (FT) computer system includes a primary node; a secondary node; a respective hardware network interface; and a respective checkpoint shim. In an embodiment, each of the primary and secondary node includes a respective non-virtual operating system (OS) including a respective network driver; storage driver; and checkpoint engine. In an embodiment, the respective network interface of the primary node and the secondary node are connected to a network. In one embodiment, a request from a client is acted upon by the respective OS of the primary node and secondary node. In one embodiment, the result obtained by the OS of the primary node and the result obtained by the OS of the secondary node are compared by the network driver of the primary node for similarity. In one embodiment, if the comparison of the result obtained by the OS of the primary node and the result obtained by the OS of the secondary node indicates similarity less than a predetermined amount, the primary node network driver informs the primary node checkpoint engine to begin a checkpoint process.

One or more of the following features may be included. In one embodiment, the FT computer system may include a hardware interface interconnecting the primary node and the secondary node through their respective storage drivers, network drivers and checkpoint engines. In one embodiment, the primary node checkpoint engine notifies the primary node storage driver and the primary node network driver that a checkpoint process is about to occur. In one embodiment, the secondary node checkpoint engine notifies the secondary node storage driver, the secondary node network driver that a checkpoint process is about to occur. In one embodiment, the respective checkpoint on the primary and secondary node is paused as the respective primary and secondary node storage drivers complete any pending input/output (I/O).

In one embodiment, the primary node checkpoint shim creates a list comprising primary node memory locations that have been modified. In one embodiment, a section of protected memory that is used by one or more of the network driver, the storage driver, and the checkpoint engine to store protected information is excluded from one or more lists of modified memory locations. In one embodiment, the protected information comprises state information that is not overwritten during a checkpoint. In one embodiment, the protected information comprises state information that flagged or identified such that it is not copied by copying component of a checkpoint engine. In one embodiment, the primary node checkpoint engine calculates a composite list comprising the union of the list comprising primary node memory locations that have been modified and the list comprising secondary node memory locations that have been modified and transmits the modified memory to the secondary node checkpoint engine. In one embodiment, the protected information comprises state information that is not or cannot be overwritten on the secondary node by a checkpoint.

In one embodiment, the network adapter of secondary node is held in a quiesced state and transitioned to an active state only if the secondary node is promoted to primary node. In one embodiment, after each checkpoint, information from the protected memory of the secondary is used to modify the new copied memory image on the secondary in order to make the memory image consistent with the secondary storage adapter hardware state. In one embodiment, the primary node checkpoint shim captures the state of the processor and devices of the primary node and transfers the state of the primary node processor and devices to the secondary node checkpoint shim. In one embodiment, upon the transfer of the state of the primary node processor and devices to the secondary node checkpoint shim, the respective checkpoint engines of the primary and secondary nodes notify their respective network driver and storage driver that the checkpoint process is complete and the respective non-virtual OS of the primary node and the secondary node resume.

In one embodiment, the secondary node checkpoint shim creates a list comprising secondary node memory locations that have been modified. In one embodiment, a section of protected memory that is used by one or more of the network driver, the storage driver, and the checkpoint engine to store protected information is excluded from one or more lists of modified memory locations. In one embodiment, the primary node checkpoint engine calculates a composite list comprising the union of the list comprising primary node memory locations that have been modified and the list comprising secondary node memory locations that have been modified and transmits the composite list to the secondary node checkpoint engine. In one embodiment, the primary node checkpoint shim captures the state of the processor and devices of the primary node and transfers the state of the primary node processor and devices to the secondary node checkpoint shim. In one embodiment, upon the transfer of the state of the primary node processors and devices to the secondary node checkpoint shim, the respective checkpoint engines of the primary and secondary nodes notify their respective network driver and storage driver that the checkpoint process is complete and the respective non-virtual OS of the primary node and the secondary node resume.

In an embodiment, a method of performing fault tolerance in a fault tolerant (FT) computer system includes a primary node having a primary node processor; a secondary node having a secondary node processor, each node further comprising a respective memory; a respective hardware network interface connected to a network; a respective checkpoint shim; each of the primary and secondary computer node further comprising: a respective non-virtual operating system (OS), each non-virtual OS comprising a respective; network driver; storage driver; and checkpoint engine; the method comprising the steps of: acting upon a request from a client communicating through the network by the non-virtual OS of the primary node to generate a primary node result and the non-virtual OS of the secondary node to generate a secondary node result, comparing, by the network driver of the primary node, the primary node result and the secondary node result for similarity, and if the comparison of the primary node result and the secondary node result indicates similarity less than a predetermined amount, informing, by the primary node network driver, the primary node checkpoint engine to begin a checkpoint process.

One or more of the following features may be included. In one embodiment, the method may include the step of notifying, by the primary node checkpoint engine, the primary node storage driver, the primary node network driver, the primary node checkpoint shim and the secondary node checkpoint engine that a primary node checkpoint process is about to occur. In one embodiment, the method may include the step of notifying, by the secondary node checkpoint engine, the secondary node storage driver and the secondary node network driver that a secondary node checkpoint process is about to occur. In one embodiment, the method may include the step of pausing the respective checkpoint process on the primary and secondary node as the primary node storage driver and the secondary node storage driver complete any pending input/output (I/O). In one embodiment, the method may include the step of creating, by the primary node checkpoint shim, a list comprising primary node memory locations that have been modified. In one embodiment, the method may include the step of calculating, by the primary node checkpoint engine, a composite list comprising the union of the list comprising primary node memory locations that have been modified and the list comprising secondary node memory locations that have been modified and transmitting the modified memory to the secondary node checkpoint engine.

One or more of the following features may be included. In one embodiment, the method may include the step of creating, by the secondary node checkpoint shim, a list comprising secondary node memory locations that have been modified. In one embodiment, the method may include the step of calculating, by the primary node checkpoint engine, a composite list comprising the union of the list comprising primary node memory locations that have been modified and the list comprising secondary node memory locations that have been modified and transmitting the composite list to the secondary node checkpoint engine. In one embodiment, contents of protected memory are excluded from the composite list and/or not used in its creation. In one embodiment, the method may include capturing, by the primary node checkpoint shim, the state of the processor and devices of the primary node and transferring the state of the primary node processor and devices to the secondary node checkpoint shim. In one embodiment, upon the transfer of the state of the primary node processor and primary node devices to the secondary node checkpoint shim, the primary node checkpoint engine notifies primary node network driver and the primary node storage driver that the checkpoint process is complete and the non-virtual OS of the primary node resumes. In one embodiment, the secondary node checkpoint engine notifies the secondary node network driver and the secondary node storage driver that the checkpoint process is complete and the non-virtual OS of the secondary node resumes.

In an embodiment, a Fault Tolerant (FT) computer system includes a primary node comprising a first checkpoint shim, and a first non-virtual operating system (OS), the first non-virtual OS comprising a first network driver; a first storage driver; and a first checkpoint engine; a secondary node comprising a second checkpoint shim and second non-virtual OS, the second non-virtual OS comprising a second network driver; a second storage driver; and a second checkpoint engine. In one embodiment, if a comparison of a result to a request from a client obtained by the first non-virtual OS and a result obtained to the request from the client by the second non-virtual OS indicates similarity less than a predetermined amount, the first network driver informs the first checkpoint engine to begin a checkpoint process.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

BRIEF DESCRIPTION OF THE DRAWINGS

The structure and function of the disclosure can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

DETAILED DESCRIPTION

Figure 1:
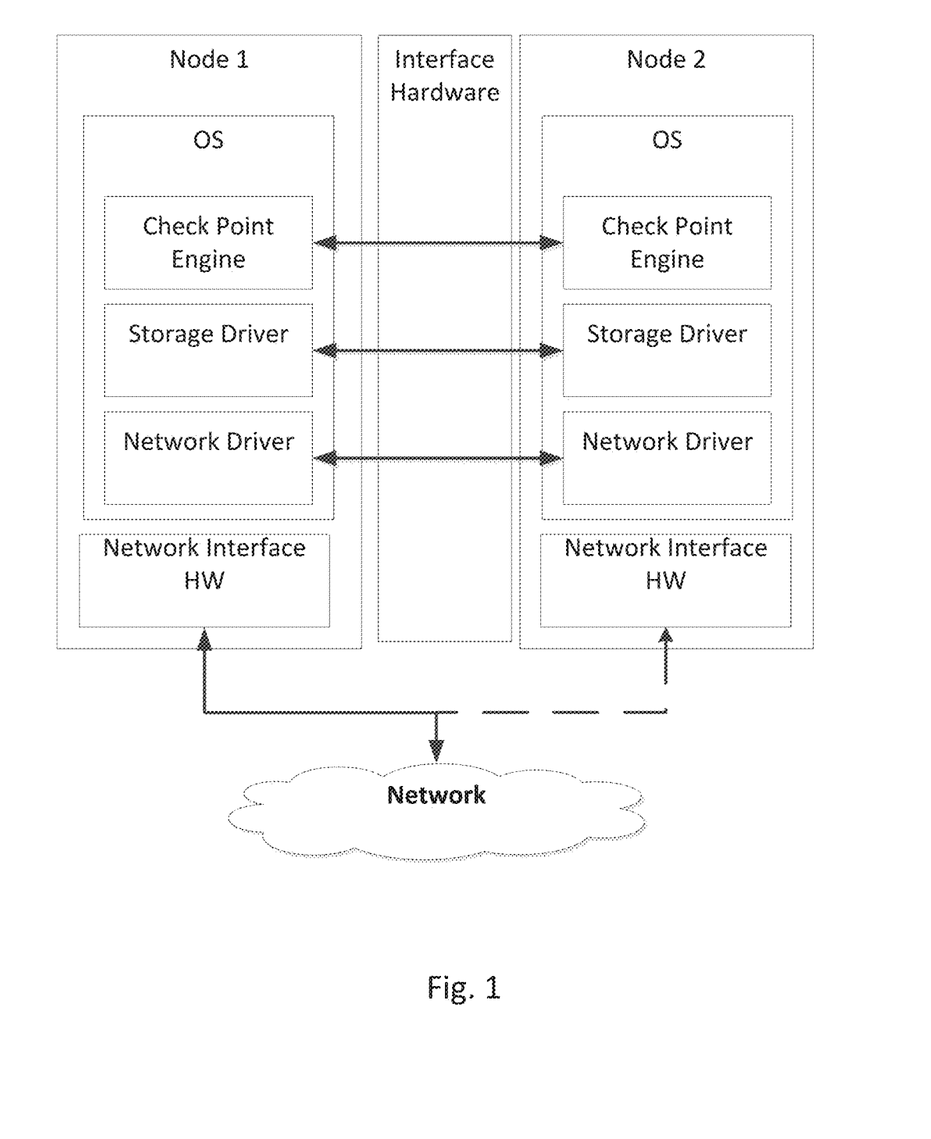
FIG. 1 is a highly schematic diagram of an embodiment of a fault tolerant system including two interconnected nodes.

A fault tolerant computer system frequently includes two processor subsystems, generally referred to as the primary and secondary nodes. These nodes either operate substantially synchronously executing the same program in parallel (active-active) or operating with one system, the primary node, actively doing useful computations with the secondary node standing by (active-standby) waiting for a failure of the primary system. If the primary system fails the secondary takes over as the new primary and continues the work of the failing primary, allowing it to be replaced. An exemplary implementation is shown in FIG. 1.

Generally, when an external system (client) makes a request to the fault tolerant system for a numerical or logical computation or for data, how the request is handled depends on how the fault tolerance in the system is achieved. If fault tolerance is achieved because the system has two active processors (active-active), the request is sent to the primary node which also sends it to secondary node for processing. Both the primary and secondary node make the computations or retrieve the data requested but only the primary node actually sends the results back to the external system (client) if the primary and secondary systems have produced a sufficiently equivalent response.

Alternatively, if fault tolerance is achieved using a system with an active and a standby processor (active-standby), the request is sent to the primary system and the primary system sends the result(s) back to the external system (client).

In fault tolerant redundant systems, it is important that if the primary system fails and the secondary system takes over computation, there should be no substantive changes to any results sent to the external systems (clients). In other words, external systems (clients) should not detect that the original primary system is no longer present and that the original secondary is now serving in the capacity of primary.

There are multiple ways to achieve this anonymous substitution. One way (active standby) is periodically to replicate a primary system, executing as a virtual machine (PVM) on one node to a secondary virtual machine (SVM) executing on a second node. This replicated secondary virtual machine can then take over if the primary virtual machine fails. The periodic replication of the PVM to the SVM is a well-known technique and results in significant loss of performance due to increased network latency because outgoing network traffic from the PVM is blocked until a checkpoint is copied to and acknowledged by the SVM. Such network latency can be reduced by more frequent checkpoints, but increased overhead due to frequent checkpointing also has a negative performance impact.

One way to reduce the latency caused by the checkpointing overhead is to utilize an active-active fault tolerant virtual based machine system such as COarse-grained LOck-stepping (COLO). In COLO type systems the primary and secondary virtual machines, each on their respective primary and secondary node, both execute the request from the client. (FIG. 2) COLO type systems can be modified and changed with various components and operating parameters to overcome technical challenges associated with these systems.

Upon completion of the request, the result from the primary virtual machine is compared to the result from the secondary virtual machine. If the results from the PVM and SVM are substantially similar, the PVM immediately sends the result to the client and the results from the SVM are discarded. The PVM and SVM then continue to process other requests.

If, however, the results from the PVM and the SVM are not substantially similar, the PVM declares a checkpoint and the state of the PVM is copied to the secondary node replacing the current SVM. When the checkpointing is complete the PVM and newly copied SVM continue handling the requests from clients. The term "substantially similar results" is used rather than "identical results" because the same request made to both the PVM and SVM on different nodes do not result in deterministic execution. There are multiple reasons for this non-deterministic execution. For example: the clocks in the PVM and SVM are not synchronized; the reception of the request by the PVM and SVM do not occur at the exact same time; the result may be packaged in different sized packets: and so on. COLO type systems have multiple ways of dealing with these indeterminacies.

Referring again to FIG. 2, in operation of a COLO type system, a request from a client on the external network is received in the input/output (I/O) portion of the primary node which is called Domain 0. Domain 0 is itself a virtual machine that sends the request both to the primary virtual machine located on the primary node and also sends the request through an internal network to Domain 0 node of the secondary node which then sends it to the secondary virtual machine (SVM). Domain 0 handles I/O for all virtual machines in the node. The result to the request from the client, that is obtained by the SVM, is sent to a COLO manager located in Domain 0 of the secondary node which transfers the result back across the internal network to a COLO manager on the primary node. The result obtained by the PVM in response to the client request is also sent to the COLO manager on the primary node and the results from the PVM and SVM are compared. If the COLO manager finds that the results are not "similar enough" the COLO manager does not release the network packet and causes a checkpoint to be declared. Once the checkpoint is declared, the state of the PVM and the contents of the PVM memory are copied to the SVM. Once the checkpoint is complete the COLO manager releases the packet that was held and restarts the PVM and SVM from the point in time at which the differences in the results from the PVM and SVM resulted in the checkpoint being declared.

The use of virtual machines in a fault tolerant environment has multiple benefits, including, but not limited to, the ability to run multiple virtual machines on a single hardware server, the ability to apportion physical server hardware resources to individual virtual machines and the ability to take a snapshot of the state of a virtual machine and resume operation using the virtual machine state at the time of the snapshot, on a different virtual machine.

However, along with these benefits come the costs associated with having multiple virtual machines. A server executing calculations with virtual machines also includes an overarching control system called a hypervisor for providing the interface between the virtual machines and the physical hardware of the server. For example, some of the hypervisor's tasks include but are not limited to allocating execution time on physical processor, allocating space in the physical memory and directing the movement of data between the virtual machines. The result of this level of indirection is increased overhead because the virtual machines do not interact with the hardware directly.

Applications in an FT environment that do not need the functionality of numbers of virtual machines but do need to reduce the overhead inherent to the virtual system may instead run on separate physical servers acting as the primary and secondary nodes. These systems still require the ability to checkpoint between the primary and secondary nodes while operating as an FT system.

OS Based Checkpointing Implementations and Features

Figure 3:
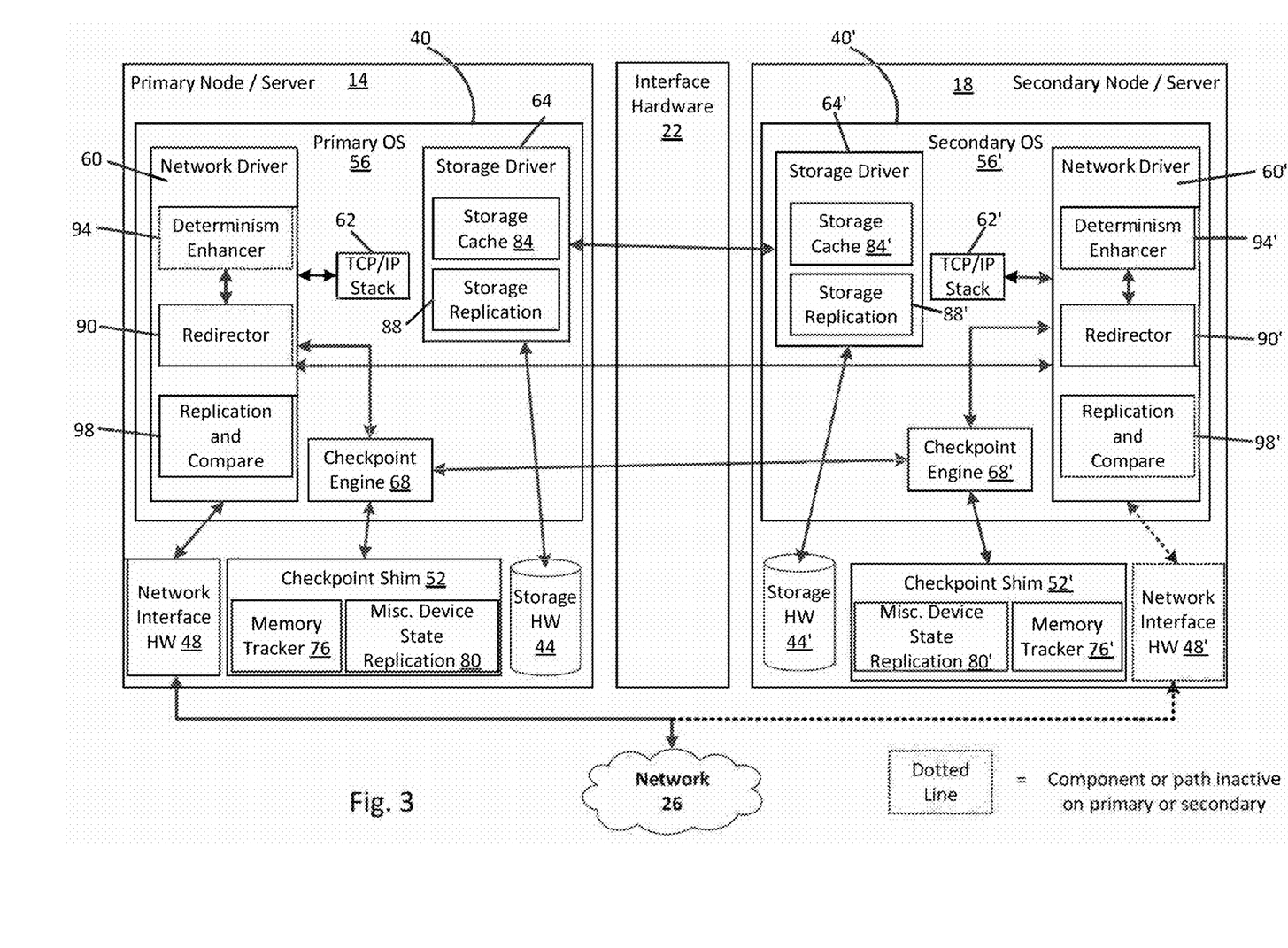
FIG. 3 is a highly schematic diagram of an embodiment of a fault tolerant operating system architecture with active-active OS-based checkpointing according to an embodiment of the disclosure.

In brief overview, an embodiment of a software and hardware architecture for a fault tolerant operating system with active-active OS based checkpointing is shown in FIG. 3. In this embodiment the FT system does not make use of virtual machines and instead has a single operating system on each node interacting directly with the hardware. In one embodiment the determination to require a checkpoint is made by comparing whether the results obtained from a primary node (PN) and a secondary node (SN) in response to a client request are substantially similar. If the results are substantially the same no checkpointing is required, the results from the PN are transmitted to the client, and the results from the SN are deleted. If the results from both nodes are not substantially the same, the PN declares that a checkpoint is needed and the state of the PN is copied to the SN.

In more detail, each processor system 40, 40' includes an operating system 56, 56'. The operating systems 56, 56' each includes a network driver 60, 60' connected to its respective network interface 48, 48', TCP/IP stack 62, 62', and the corresponding network interface 48', 48 of the operating system 56', 56 of the other node 18, 14. An embodiment of a fault tolerant system, constructed in accordance with the disclosure, includes a primary node/system 14 and a secondary node/system 18 interconnected by an internal computer interconnect 22, such as a standard network or a PCI bridge, and connected to an external network 26. Each of the primary 14 and secondary 18 nodes includes a processor system 40, 40', memory, a storage system 44, 44', a network interface 48, 48' capable of communication with the external network 26, and a checkpoint shim 52, 52' to assist with tracking dirty pages and performing miscellaneous device state replication between the primary 14 and secondary 18 node during checkpoint operations. The primary 14 and secondary 18 nodes are substantially identical in both hardware and software because in the event of a primary node 14 failure, the secondary node 18 will become the new primary node. In various embodiments, references to ', '', ''', etc. may also be replaced or designated by a, b, c or other references numbers, letters or callouts without limitation.

In more detail, each processor system 40, 40' includes an operating system 56, 56'. The operating systems 56, 56' each includes a network driver 60, 60' connected to its respective network interface 48, 48', TCP/IP stack 62, 62', and the corresponding network interface 48', 48 of the operating system 56', 56 of the other node 18, 14. The operating system 56, 56' also includes a storage driver 64, 64' connected to both the node's respective storage system 44, 44' and the storage driver 64', 64 of the other node 18, 14, and a checkpoint engine 68, 68'. The checkpoint engine 68, 68' of a given node is in communication with a checkpoint shim 52, 52' associated with the respective node 14, 18.

Considering the network driver 60, 60', storage driver 64, 64', checkpoint engine 68, 68' and the checkpoint shim 52, 52' in more detail; the checkpoint engine 68, 68' handles the timing and control of the checkpointing operations. The checkpoint shim 52, 52' includes a memory tracker 76, 76' that assists with tracking memory that has been modified on the primary node and secondary node before the checkpointing operation and that will be copied to the secondary node during the checkpoint operation described below. Such modified memory is termed dirty memory. There is a section of memory not tracked and hence not copied to the secondary node during a checkpoint. This section of memory is referred to herein as protected memory, isolated memory, or non-copiable memory in some embodiments. Protected memory typically includes a small percentage, such as less than about 2%, of on board memory, such as RAM, for a given primary and/or secondary node. Each node can include one or more memory devices, which may include on board ram or other memory suitable for storing protected information. The protected memory stores protected information that is used by one or more of the network driver, the storage driver, and the checkpoint engine. Protected memory can be indexed, flagged, or otherwise identified such that one or more components of a checkpoint engine or another component of an active active fault tolerant system are informed of its location/existence. Protected memory can be tracked by a one or more components of a fault tolerant system such that it is not copied and/or not overwritten in some embodiments. In various embodiments, protected memory stores protected information that is not or cannot overwritten during a checkpoint and/or that is excluded from copying during some checkpoint processes. The checkpoint shim 52 also includes a miscellaneous device state replication module 80, 80' that replicates the device state of devices on the node not otherwise captured by the OS of the node. Protected information can include a node identifier. A node identifier can be used to specify whether a given node is operating as a primary node or a secondary node.

The storage driver 64, 64' handles read and write operations to the local disk storage 44, 44' and to the corresponding driver on the other node. The storage driver 64, 64' also ensures the replication of data across both nodes and provides the modified storage state from the primary node storage to secondary node storage. In addition, the storage driver includes a storage cache (84, 84') and storage replication (88, 88'). The storage driver caches storage writes occurring between each checkpoint in the storage cache (84, 84'), on both primary and secondary nodes.

While the node is making useful computations, the OS's view of storage is allowed to diverge between the nodes, because each node operates independently and potentially issues different write requests to memory. Following each checkpoint, the secondary storage must be made identical to the primary storage. Temporarily caching data writes instead of committing (actually writing) them to the storage media permits the secondary cache simply to be discarded following the completion of a checkpoint. It would also be problematic to commit primary writes to the storage media before undertaking a checkpoint, in case the primary node fails requiring eventual recovery by the secondary node and the subsequent discarding of the primary node cache.

The storage replication component (88, 88') of the storage driver supports replicating storage between primary and secondary nodes. At the start of a run interval during which each node begins useful computations, data storage must be identical. This requires an initial full synchronization operation before the start of the run interval. Working in conjunction with the Storage Cache portion of the driver, the storage replication component of the storage driver replicates storage modifications from primary to secondary nodes as each checkpoint is taken, and commits the modifications to the secondary storage media.

As part of the checkpoint process, once the memory image is copied to the secondary node, the storage driver modifies the new memory image on the secondary node with state preserved on the secondary in protected memory. In this scenario, the protected memory includes memory that was not copied during a checkpoint or another fault tolerant operation. The protected memory may include state information from one or more drivers that is used in lieu of copied information to facilitate one or more drivers being in a consistent state relative to the other software, memory, state, etc. changes that may arise from a checkpoint process. Deliberately not copying protected memory facilitates a new memory image being in a consistent state with the storage interface hardware on the node that receives the checkpoint. An example of such state information is the storage command queue index pointed to by the storage hardware interface of the node being checkpointed-to, such as for example, the secondary node.

Similarly, the network driver 60, 60' controls: the transfer of data from the network interface 48, 48' from and to the network 26; information with the network driver on the other node; and the TCP/IP stack 62. In addition, the network driver includes a redirector 90, 90', a determinism enhancer 94, 94', and a replication and compare module/component 98, 98'. The redirector 90 of the PN 14 supplies, to the SN 18, a copy of any incoming packets received from client over the network 26. Once the SN returns a response to the client query, the response is supplied to the PN by the SN redirector 94' and compared by the PN replication and compare module 98 to the response from the PN to determine the similarity between the results from the PN and the results from the SN. If the similarity is sufficient, no checkpoint is required and the results from the PN are returned to the client. If the results are not sufficiently similar, the packet is blocked from being transmitted to the network and is held in the replication and compare (98, 98') module. At this time the checkpoint engine 68 is notified; and the checkpoint sequence is started.

The determinism enhancer 94' of the SN is used to enhance the similarity between the packets received from the SN and the PN so as to reduce the number of checkpoints declared. In one embodiment the determinism enhancer 94, 94' adjusts the sequence numbers of the TCP packets on the secondary node so they match the sequence number of the packets on the primary node. When the PN and SN start a TCP session they each start it with a different random sequence numbers. However it is only the packet from the primary (and its corresponding sequence number) that is transmitted on the network. When the acknowledgement comes back from the client it is forwarded by the PN to the SN as are all incoming packets. At this point the SN determinism enhancer determines the sequence number sent from the PN and adjusts its own sequence number accordingly on all subsequent outgoing packets for that session.

Figure 2:
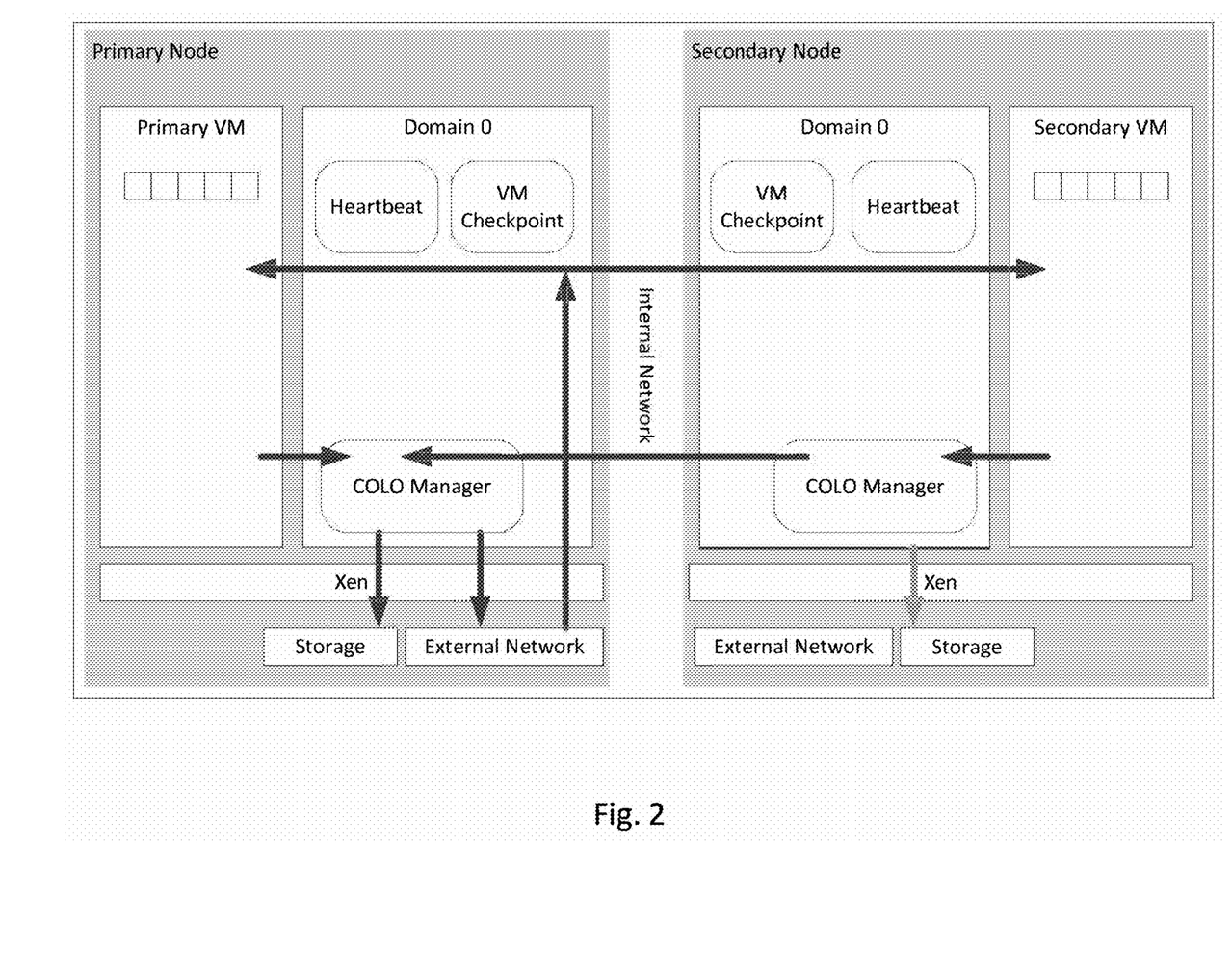
FIG. 2 is a highly schematic diagram of an embodiment of a virtual machine-based fault tolerant system.
Figure 4A:
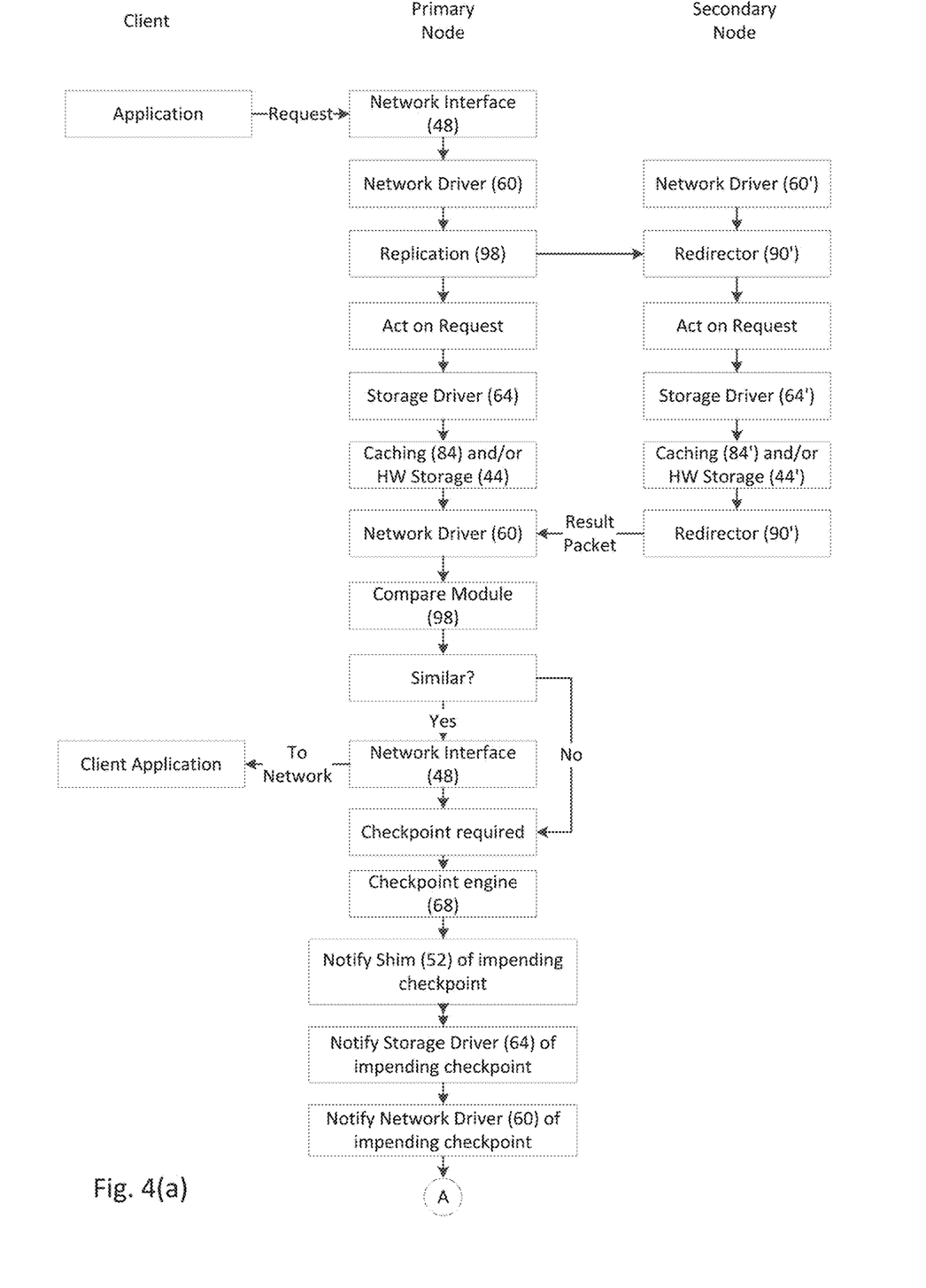
FIGS. 4(a) and (b) is a flow diagram of an embodiment of the operation of an embodiment of the disclosure.
Figure 4B:
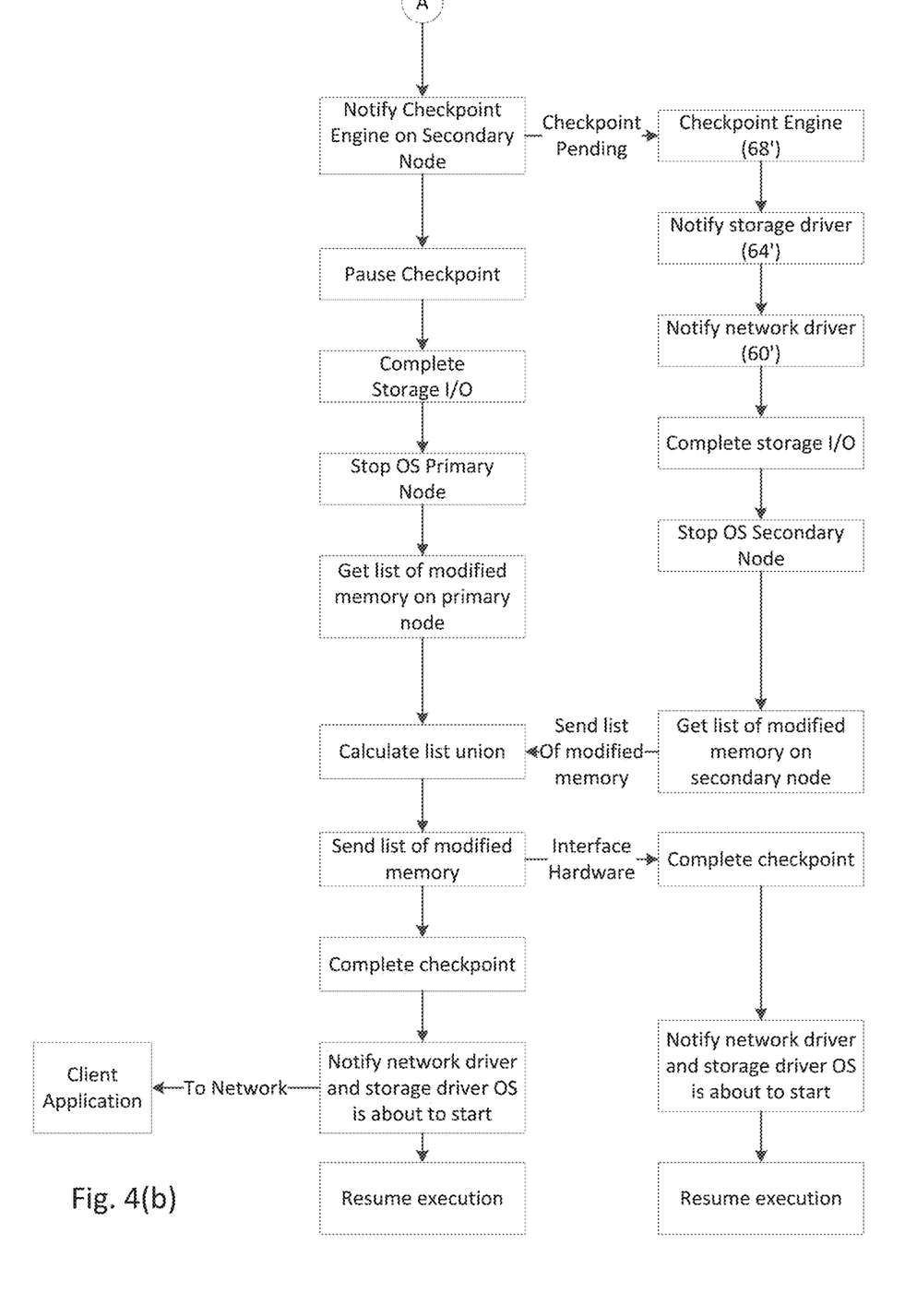

In more detail, and referring to FIGS. 2, 3 and 4(*a*)(*b*), in operation a request from a client is received into the fault tolerant system from the network 26. A given fault tolerant system may include the primary node and the secondary node and one or more components or combinations of components thereof. The request is received by the primary node network interface 48 and is acted upon by the replication and compare module 98 of the network driver 60. The request is replicated 98 and sent to the redirector 90' of the secondary node network driver 60'. Both nodes then respond to the request which may include accessing storage cache 84, 84' or hardware storage 44, 44' using the storage driver 64, 64'.

In one scenario, once the results are generated by the secondary node 18, the response is packetized and the response packet is sent by the redirector 90' of the secondary node network driver 60' to replication and compare module 98 of the primary node network driver 60.

The primary node network driver 60 then uses its replication and compare module 98 to measure the similarity of the primary and secondary packetized results and to determine the degree of similarity. If the similarity of the packets is close enough, as described below, the packetized results from the primary node propagate through network hardware interface 48 back through the network 26 to the client node making the request. If the similarity is determined to not be similar enough, the network driver 60 signals the need for a checkpoint to the check point engine 68. "Similar enough" for TCP packets means that the data stream, when extracted from the TCP/IP packets, is the same between primary node results and secondary node results. In the case where a User Data Protocol (UDP) is used rather than a TCP, it means the data length and data content within each packet are the same.

In the case where the packets were not similar enough and a checkpoint is called, the primary node checkpoint engine 68 notifies the primary node storage driver 64 and network driver 60 that a checkpoint is about to occur. The checkpoint engine 68 also notifies the checkpoint shim 52 and the checkpoint engine 68' of the secondary node of the impending checkpoint. The secondary node checkpoint engine 68' notifies the secondary node storage driver 64' and network driver 60' that a checkpoint is about to occur. The checkpoint is then paused while the storage drivers 64, 64' block any new storage I/O and complete any pending I/O storage including cache I/O.

Once the storage driver 64 on the primary node indicates to the checkpoint engine 68 that the pending I/O is complete, the primary OS 56 is halted. That is, all OS threads except for those executing the checkpointing functionality; basically everything but the checkpoint engine and checkpoint shim, are halted. The list that includes modified memory locations recorded by memory tracker 76 of the primary shim 52 while the application was running on the primary node is completed. In one embodiment, modified memory is compressed or transformed to reduce the data being sent and the compressed or reduced modified memory is sent to the checkpoint engine 68' on the secondary node.

In parallel with the steps described in the previous paragraph as taken by the primary node, the checkpoint is then delayed while the storage drivers 64' complete pending storage I/O. When the pending I/O is complete the storage driver 64' notifies the checkpoint engine 68' and the secondary node OS is halted. The list that includes modified memory locations recorded by memory tracker 76' of the secondary shim 52' while the guest was running on the secondary node is completed. The union of these two modified memory lists is calculated by the checkpoint engine 68 of the primary node and the resulting modified memory is sent to the checkpoint engine 68' on the secondary node. In one embodiment, modified memory is compressed or transformed to reduce the data being set and the compressed or reduced modified memory is sent to the checkpoint engine 68' on the secondary node. Transmission of the modified memory to the secondary node 18 occurs through the hardware interface 22.

In this embodiment the checkpoint shim 52 on the primary node 14 then captures the state of the processor and devices of the primary node 14 and transfers that state information to checkpoint shim 52' of the secondary node 18 by way of the interface hardware 22. Once the state information of the primary node 18 has been transferred and applied to the secondary node, the network driver 60, 60' and the storage driver 64, 64' are notified by the nodes' respective checkpoint engines 68, 68' that the checkpoint is complete and the OS 56, 56' of both nodes 14, 18 are about to resume where the checkpoint state was declared. At this point both the primary 14 and secondary nodes resume OS execution. The network packet which caused the comparison to fail and initiated the checkpoint is then released from the primary node now that the checkpoint ensured the primary node and secondary node are in the same state.

It should be noted that although the embodiment described does not use virtualization it does use hardware features designed to support virtualization in a non-virtualization context to accelerate performance. One such feature is hardware that maintains a list that includes pages that have been modified by the OS. By using memory tracking the disclosure can transfer only pages that have been modified thereby reducing the amount of data transferred at checkpoints. Some hardware, such as Intel processors support memory tracking as part of its support of virtualization. This memory tracking feature is called PML (page modification logging). To use PML on these hardware implementations, the actual operating system must be misrepresented as a virtualized machine to the hardware even though it is not. In other embodiments such as on hardware that does not require virtualization to track memory, this operation would not be required.

For this tracking of memory by hardware to occur, the checkpoint shim 52, 52' is used by the primary node 14 and the secondary node 18, respectively. Each checkpoint shim 52, 52' is a container that includes the memory tracker 76, 76' and the miscellaneous device state replication 80, 80'. The checkpoint shim 52, 52' is in communication with the checkpoint engine 68, 68' respectively.

In brief overview, in one embodiment the checkpoint shim utilizes Intel's PML (Page Modification Logging) hardware feature to track memory. In order to use PML it is necessary to enable VT-x hardware virtualization extensions. If VT-x is enabled, hardware reserves a contiguous area of physical memory for virtual machine monitor (VMM) code to operate. In one embodiment of the disclosure the checkpoint engine loads the checkpoint shim (VMM) code image into this reserved contiguous memory region. In a typical virtual machine environment VMM code is invoked when a virtualized guest operating system executes an instruction that needs special handling; such as interrupts, memory faults, IO access, certain privileged instructions, and indications that the PML generated list that includes modified memory locations needs to be serviced.

Because PML tracking only works for virtual machines, an embodiment of the disclosure, in one embodiment, mischaracterizes the OS, as part of an embodiment disclosed, to the hardware, as a VM, (even though it is not) in order to utilize the PML memory tracking feature. The VMM is also used to read and write the state of IO devices so that the state of the devices can be sent to the partner node during a checkpoint.

In more detail, in one embodiment, the memory tracker 76 uses the processor hardware to track memory modified by the OS as discussed above. The checkpoint shim 52 uses a portion of contiguous non-OS memory reserved at node boot time to hold the code that interacts with the hardware to perform memory tracking. The checkpoint engine 68 installs the checkpoint shim 52 whose main function is to interface with the processor hardware to track memory modifications. That means when memory is written by the OS, the page pointer containing the memory write is logged and the memory tracker (76, 76') of the checkpoint shim (52, 52') coordinates with the checkpoint engine to maintain buffers containing dirty memory lists. The checkpoint shim also implements a command interface to service requests from the checkpoint engine for such purposes as reading and restoring device state tracked by the miscellaneous device state replication module.

It should be noted that though the memory tracking embodiment above tracks memory modifications at the page level, other embodiments may track memory at a different granularity.

The checkpoint shim also contains the miscellaneous device state replication module which captures device state from one node and applies the device state to the other node as part of the checkpoint. The checkpoint engine 68 on the primary node 14 issues a request to the checkpoint shim, to read device and processor state, such as Timestamp Counters, processor registers, stack, and other data, and to record that device state data in the reserved memory region before it is transferred to the secondary node. The device state managed by the Miscellaneous Device State Replication (80, 80') portion of the Checkpoint Shim (52, 52'), is read from a reserved memory region in the miscellaneous device state replication module on the primary node and sent to a reserved memory region in the miscellaneous device state replication module on the secondary node.

The checkpoint engine 68' on the secondary node requests the checkpoint shim to wait for the complete checkpoint data to be received, including the dirty page data and the miscellaneous device state data, and then the checkpoint shim applies that data and resumes to the OS in the context of the new checkpoint.

The systems and methods disclosed herein also include various features relating to technical problems that arise during active active checkpointing and OS based checkpointing. In one embodiment, OS-based checkpointing lacks a virtualization layer and is implemented in the operating system itself. In OS based checkpointing the checkpointed OS interfaces directly to the hardware. In part, the disclosure relates to systems, methods, and components to facilitate a checkpoint target OS memory image being consistent with the checkpoint target storage hardware interface without the benefit of an intervening virtualization layer. In one embodiment, the state of the memory image copied to the secondary node is updated to be consistent with the state of the secondary's node's storage hardware prior to the completion of a checkpoint. This is facilitated by not overwriting protected memory on the secondary node and using the state information stored in protected memory on the secondary node to update state information for one or more drivers on secondary node in support of achieving post-checkpoint memory consistency. This is facilitated by not overwriting protected memory on the secondary node and using the state information stored in protected memory on the secondary node to update state information for one or more drivers on secondary node in support of achieving post-checkpoint memory consistency.

In part, the disclosure relates to systems, methods, and components to ensure checkpoint target OS memory image is consistent with the checkpoint target network interface without the benefit of an intervening virtualization layer. There are various approaches disclosed herewith to facilitate achieving such memory consistence. For one such approach, network device state is replicated from primary to secondary as part of checkpoint. Unfortunately, not all network interface hardware supports extracting or reading the internal state of the hardware. As a result, replicating network interface hardware state is not possible with all network interface hardware.

Another approach to obtaining OS memory image consistency with the network interface, in an active active system or other fault tolerant system, the network device on the secondary is reset once the state is replicated from the primary node. After such a reset, the OS image is updated to be consistent with the reset network hardware state. Again, there are limitations and constraints with this particular approach. Specifically, network hardware device reset is time-consuming and can take between about 10 ms to about 250 ms resulting in an unacceptable performance impact.

In yet another embodiment, the approach selected to obtain the consistency sought relative to the secondary network device is quiesced with no state replication or reset during checkpointing. With active-active checkpointing, the secondary network device is not used. As a result, the secondary does not receive any network packets through its network device. Instead, primary forwards all incoming network packets to secondary via private link. Further, the secondary does not transmit any network packets through its network device. Instead, outgoing network packets from network stack, such as kernel network stack, are forwarded to the primary for comparison. Since the secondary network device is never used, state replication or reset of network adapter state is not necessary except in the case of failover where it is being promoted to the role of primary network device.

In this embodiment, the secondary network driver quiesces its network device during initialization. Such quiescing may be achieved by disabling interrupts, and the receive and transmit functions in the hardware. As a result, after each checkpoint, the secondary network device remains quiesced. Further, the secondary network driver can be programmed or configured to stop the driver threads that interact with the network hardware or other hardware. In one embodiment, the secondary network driver intercepts and blocks, stops, or pauses the register reads/writes.

When the state of the secondary node is transitioned to primary, say due to a failure of the primary node or by explicit user administrative action for the purpose of servicing the primary node, the formerly quiesced secondary network interface must become active. In this embodiment activating the network adapter is accomplished by bringing down (deactivating) the adapter from the OS's perspective. This frees up all the OS resources associated with that adapter. The adapter hardware is then reset and the adapter is then brought up (re-activated) which allocates and reinitializes the OS resources needed to use the adapter. The network driver and its subcomponents then start utilizing the adapter as the primary adapter.

In one embodiment, one or more systems, components or drivers of the systems and methods disclosed herein include a replication and compare component/module. This is the portion of the OS network driver or other system module or component responsible for supplying the secondary OS incoming network packets received by the primary OS. In one embodiment, the replication and compare component/module compares outgoing packets from the primary and secondary OS and letting them propagate to the external network if they are sufficiently equivalent/similar. If the packets are not sufficiently equivalent/similar, the replication and compare component/module blocks the packet and signals the need for a checkpoint to the checkpoint engine. In one embodiment, this portion of the network driver is only active on the primary node/source node or server. In one embodiment, one or more systems, components or drivers of the systems and methods disclosed herein include a determinism enhancer. The determinism enhancer component of the OS network driver modifies the headers of TCP and other packet types to improve output packet similarity in order to reduce the frequency of checkpoints. This portion of the network driver is only active on the secondary node/server in some embodiments.

In one embodiment, one or more systems, components or drivers of the systems and methods disclosed herein include a redirector. In one embodiment, the redirector is a component of the OS network driver, and is only active on the secondary server/node and is responsible for receiving incoming network packets from the primary and for sending outgoing network packets to the primary.

General and Specific Computer-Based Implementations and Embodiments

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the disclosure. The examples are intended primarily for purposes of illustration of the disclosure for those skilled in the art. No particular aspect or aspects of the examples are necessarily intended to limit the scope of the disclosure.

The figures and descriptions of the disclosure have been simplified to illustrate elements that are relevant for a clear understanding of the disclosure, while eliminating, for purposes of clarity, other elements. Those of ordinary skill in the art may recognize, however, that these sorts of focused discussions would not facilitate a better understanding of the disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the disclosure, a single component may be replaced by multiple components, and multiple components may be replaced by a single component, to perform a given function or functions. Except where such substitution would not be operative to practice embodiments of the disclosure, such substitution is within the scope of the disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%. A given similarity threshold may represent a difference of between about 0.5% to about 10% in some embodiments. In other embodiments. A given similarity threshold may represent a difference of between about 0.1% to about 0.5%. A given similarity threshold may represent a difference of between about 1% to about 5%.

The disclosure may be embodied in other specific forms without departing from the spirit or essential characteristics thereof. The foregoing embodiments are therefore to be considered in all respects illustrative rather than limiting on the disclosure described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. A fault tolerant (FT) computer system comprising:
a primary node comprising one or more memory devices;
a secondary node comprising one or more memory devices;
   each of the primary and secondary node comprising a respective non-virtual operating system (OS) comprising a respective
   network driver;
   storage driver; and
   checkpoint engine;
   a respective network interface; and
   a respective checkpoint shim; and
wherein the respective network interface of the primary node and the secondary node are connected to a network,
wherein a request from a client is acted upon by the respective OS of the primary node and the secondary node,
wherein the result obtained by the OS of the primary node and the result obtained by the OS of the secondary node are compared by the network driver of the primary node for similarity, and
wherein if the comparison of the result obtained by the OS of the primary node and the result obtained by the OS of the secondary node indicates similarity less than a predetermined amount, the primary node network driver informs the primary node checkpoint engine to begin a checkpoint process,
wherein a secondary node checkpoint shim creates a list comprising secondary node memory locations that have been modified.

2. The FT computer system of claim 1 further comprising a hardware interface interconnecting the primary node and the secondary node through their respective storage drivers, network drivers and checkpoint engines.

3. The FT computer system of claim 2, wherein network adapter of secondary node is held in a quiesced state and transitioned to an active state only if the secondary node is promoted to primary node.

4. The FT computer system of claim 2 where after each checkpoint, information from a protected memory of the secondary is used to modify the new copied memory image on the secondary in order to make the memory image consistent with the secondary storage adapter hardware state.

5. The FT computer system of claim 1 wherein the primary node checkpoint engine notifies the primary node storage driver and the primary node network driver that a checkpoint process is about to occur.

6. The FT computer system of claim 5 wherein the secondary node checkpoint engine notifies the secondary node storage driver and the secondary node network driver that a checkpoint process is about to occur.

7. The FT computer system of claim 1 wherein the primary node checkpoint engine calculates a composite list comprising the union of the list comprising primary node memory locations that have been modified and the list comprising secondary node memory locations that have been modified, excluding contents of protected memory and transmits the memory locations corresponding to the composite list to the secondary node checkpoint engine.

8. The FT computer system of claim 1 wherein the primary node checkpoint shim captures a state of a processor and devices of the primary node and transfers the state of the primary node processor and devices to the secondary node checkpoint shim.

9. A fault tolerant (FT) computer system comprising:
a primary node comprising one or more memory devices;
a secondary node comprising one or more memory devices;
   each of the primary and secondary node comprising a respective non-virtual operating system (OS) comprising a respective
   network driver;
   storage driver; and
   checkpoint engine;
   a respective network interface; and
   a respective checkpoint shim; and
wherein the respective network interface of the primary node and the secondary node are connected to a network,
wherein a request from a client is acted upon by the respective OS of the primary node and the secondary node,
wherein the result obtained by the OS of the primary node and the result obtained by the OS of the secondary node are compared by the network driver of the primary node for similarity, and
wherein if the comparison of the result obtained by the OS of the primary node and the result obtained by the OS of the secondary node indicates similarity less than a predetermined amount, the primary node network driver informs the primary node checkpoint engine to begin a checkpoint process, wherein the respective checkpoint on the primary and secondary node is paused as the respective primary and secondary node storage drivers complete any pending input/output (I/O),
wherein the secondary node checkpoint engine notifies the secondary node storage driver and the secondary node network driver that a checkpoint process is about to occur,
wherein the primary node checkpoint engine notifies the primary node storage driver and the primary node network driver that a checkpoint process is about to occur.

10. The FT computer system of claim 9 wherein a primary node checkpoint shim creates a list comprising primary node memory locations that have been modified.

11. The fault tolerant (FT) computer system comprising:
a primary node comprising one or more memory devices;
a secondary node comprising one or more memory devices;
each of the primary and secondary node comprising a respective non-virtual operating system (OS) comprising a respective
network driver;
storage driver; and
checkpoint engine;
a respective network interface; and
a respective checkpoint shim; and
wherein the respective network interface of the primary node and the secondary node are connected to a network,
wherein a request from a client is acted upon by the respective OS of the primary node and the secondary node,
wherein the result obtained by the OS of the primary node and the result obtained by the OS of the secondary node are compared by the network driver of the primary node for similarity, and
wherein if the comparison of the result obtained by the OS of the primary node and the result obtained by the OS of the secondary node indicates similarity less than a predetermined amount, the primary node network driver informs the primary node checkpoint engine to begin a checkpoint process,
wherein the one or more memory devices of the secondary node comprise a section of protected memory, wherein the protected memory is not overwritten during the checkpoint process,
wherein a secondary node checkpoint shim creates a list comprising secondary node memory locations that have been modified.

12. The FT computer system of claim 11, wherein the protected memory comprises state information for one or more hardware drivers or a node identifier.

13. The FT computer system of claim 12 wherein upon the transfer of the state of the primary node processor and devices to the secondary node checkpoint shim, the respective checkpoint engines of the primary and secondary nodes notify their respective network driver and storage driver that the checkpoint process is complete and the respective non-virtual OS of the primary node and the secondary node resume.

14. The FT computer system of claim 11 wherein changes to protected memory are excluded from the list comprising secondary node memory locations that have been modified.

15. A method of performing fault tolerance in a fault tolerant (FT) computer system comprising a primary node having a primary node processor; a secondary node having a secondary node processor, each node further comprising a respective memory; a respective hardware network interface connected to a network; a respective checkpoint shim; each of the primary and secondary computer node further comprising: a respective non-virtual operating system (OS), each non-virtual OS comprising a respective; network driver; storage driver; and checkpoint engine; the method comprising the steps of:
acting upon a request from a client communicating through the network by the non-virtual OS of the primary node to generate a primary node result and the non-virtual OS of the secondary node to generate a secondary node result;
comparing, by the network driver of the primary node, the primary node result and the secondary node result for similarity;
if the comparison of the primary node result and the secondary node result indicates similarity less than a predetermined amount, informing, by the primary node network driver, the primary node checkpoint engine to begin a checkpoint process; and
pausing the respective checkpoint process on the primary and secondary node as the primary node storage driver and the secondary node storage driver complete any pending input/output (I/O).

16. The method of claim 15 further comprising the step of notifying, by the primary node checkpoint engine, the primary node storage driver, the primary node network driver, the primary node checkpoint shim and the secondary node checkpoint engine that a primary node checkpoint process is about to occur.

17. The method of claim 16 further comprising the step of creating, by the secondary node checkpoint shim, a list comprising secondary node memory locations that have been modified.

18. The method of claim 15 further comprising the step of notifying, by the secondary node checkpoint engine, the secondary node storage driver and the secondary node network driver that a secondary node checkpoint process is about to occur.

19. The method of claim 18 wherein upon the transfer of the state of the primary node processor and primary node devices to the secondary node checkpoint shim, the primary node checkpoint engine notifies primary node network driver and the primary node storage driver that the checkpoint process is complete and the non-virtual OS of the primary node resumes, and
wherein secondary node checkpoint engine notifies the secondary node network driver and the secondary node storage driver that the checkpoint process is complete and the non-virtual OS of the secondary node resumes.

20. The method of claim 15 further comprising the step of creating, by the primary node checkpoint shim, a list comprising primary node memory locations that have been modified.

21. The method of claim 15 further comprising-capturing, by the primary node checkpoint shim, a state of the processor and devices of the primary node and transferring the state of the primary node processor and devices to the secondary node checkpoint shim.

22. The method of claim 15, wherein a protected information comprises a node identifier.

23. A method of performing fault tolerance in a fault tolerant (FT) computer system comprising a primary node having a primary node processor; a secondary node having a secondary node processor, each node further comprising a respective memory; a respective hardware network interface connected to a network; a respective checkpoint shim; each of the primary and secondary computer node further comprising: a respective non-virtual operating system (OS), each non-virtual OS comprising a respective; network driver; storage driver; and checkpoint engine; the method comprising the steps of:
acting upon a request from a client communicating through the network by the non-virtual OS of the primary node to generate a primary node result and the non-virtual OS of the secondary node to generate a secondary node result;

comparing, by the network driver of the primary node, the primary node result and the secondary node result for similarity;

if the comparison of the primary node result and the secondary node result indicates similarity less than a predetermined amount, informing, by the primary node network driver, the primary node checkpoint engine to begin a checkpoint process;

notifying, by the secondary node checkpoint engine, the secondary node storage driver and the secondary node network driver that a secondary node checkpoint process is about to occur; and calculating, by the primary node checkpoint engine, a composite list comprising the union of the list comprising primary node memory that has been modified and the list comprising secondary node memory that has been modified and transmitting the composite list to the secondary node checkpoint engine.

24. A method of performing fault tolerance in a fault tolerant (FT) computer system comprising a primary node having a primary node processor; a secondary node having a secondary node processor, each node further comprising a respective memory; a respective hardware network interface connected to a network; a respective checkpoint shim; each of the primary and secondary computer node further comprising: a respective non-virtual operating system (OS), each non-virtual OS comprising a respective; network driver; storage driver; and checkpoint engine; the method comprising the steps of:

acting upon a request from a client communicating through the network by the non-virtual OS of the primary node to generate a primary node result and the non-virtual OS of the secondary node to generate a secondary node result;

comparing, by the network driver of the primary node, the primary node result and the secondary node result for similarity;

if the comparison of the primary node result and the secondary node result indicates similarity less than a predetermined amount, informing, by the primary node network driver, the primary node checkpoint engine to begin a checkpoint process; and storing protected information in a section of protected memory in electronic communication with the secondary node; and preventing section of protected memory from being overwritten during a checkpoint process.

25. A method of performing fault tolerance in a fault tolerant (FT) computer system comprising a primary node having a primary node processor; a secondary node having a secondary node processor, each node further comprising a respective memory; a respective hardware network interface connected to a network; a respective checkpoint shim; each of the primary and secondary computer node further comprising: a respective non-virtual operating system (OS), each non-virtual OS comprising a respective; network driver; storage driver; and checkpoint engine; the method comprising the steps of:

acting upon a request from a client communicating through the network by the non-virtual OS of the primary node to generate a primary node result and the non-virtual OS of the secondary node to generate a secondary node result;

comparing, by the network driver of the primary node, the primary node result and the secondary node result for similarity; and if the comparison of the primary node result and the secondary node result indicates similarity less than a predetermined amount, informing, by the primary node network driver, the primary node checkpoint engine to begin a checkpoint process, wherein protected information comprises a set of hardware state information, the method further comprising updating hardware state of one or more drivers of the secondary node using the set of hardware state information.

26. The method of claim 25 further comprising quiescing one or more drivers or interfaces of the secondary node prior to updating the state of the one or more drivers or interfaces of the secondary node.

27. The method of claim 25 further comprising copying a memory image to the secondary node; and updating copied memory image to be consistent with state of one or more of the drivers or interfaces of the secondary node.

* * * * *